United States Patent [19]
Kadota

[11] Patent Number: 5,152,178
[45] Date of Patent: Oct. 6, 1992

[54] ENGINE CONTROL APPARATUS
[75] Inventor: Yoichi Kadota, Himeji, Japan
[73] Assignee: Mitsubishi Denki K.K., Tokyo, Japan
[21] Appl. No.: 696,883
[22] Filed: May 8, 1991
[30] Foreign Application Priority Data
Jun. 18, 1990 [JP] Japan ................. 2-160818
[51] Int. Cl.⁵ .......................................... G01M 19/00
[52] U.S. Cl. ..................................... 73/118.1; 73/510
[58] Field of Search ............... 73/118.1, 510; 123/479

[56] References Cited
U.S. PATENT DOCUMENTS

| | | | |
|---|---|---|---|
| 4,471,739 | 9/1984 | Yamato et al. | 123/479 |
| 4,582,035 | 4/1986 | Kishi | 123/478 |
| 4,664,082 | 5/1987 | Suzuki | 123/479 X |
| 4,825,691 | 5/1989 | Sekiguchi | 73/118.1 |
| 4,846,131 | 7/1989 | Uchinami et al. | 123/479 |

Primary Examiner—Jerry W. Myracle
Attorney, Agent, or Firm—Sughrue, Mion, Zinn, Macpeak & Seas

[57] ABSTRACT

An engine control apparatus for detecting the position of the engine main body or the actuator attached to an engine on the basis of information provided from a sensor which generates two signals having different phase, wherein the sensor is judged to be faulty when the regular pattern of the information outputted from the sensor is not detected.

4 Claims, 4 Drawing Sheets

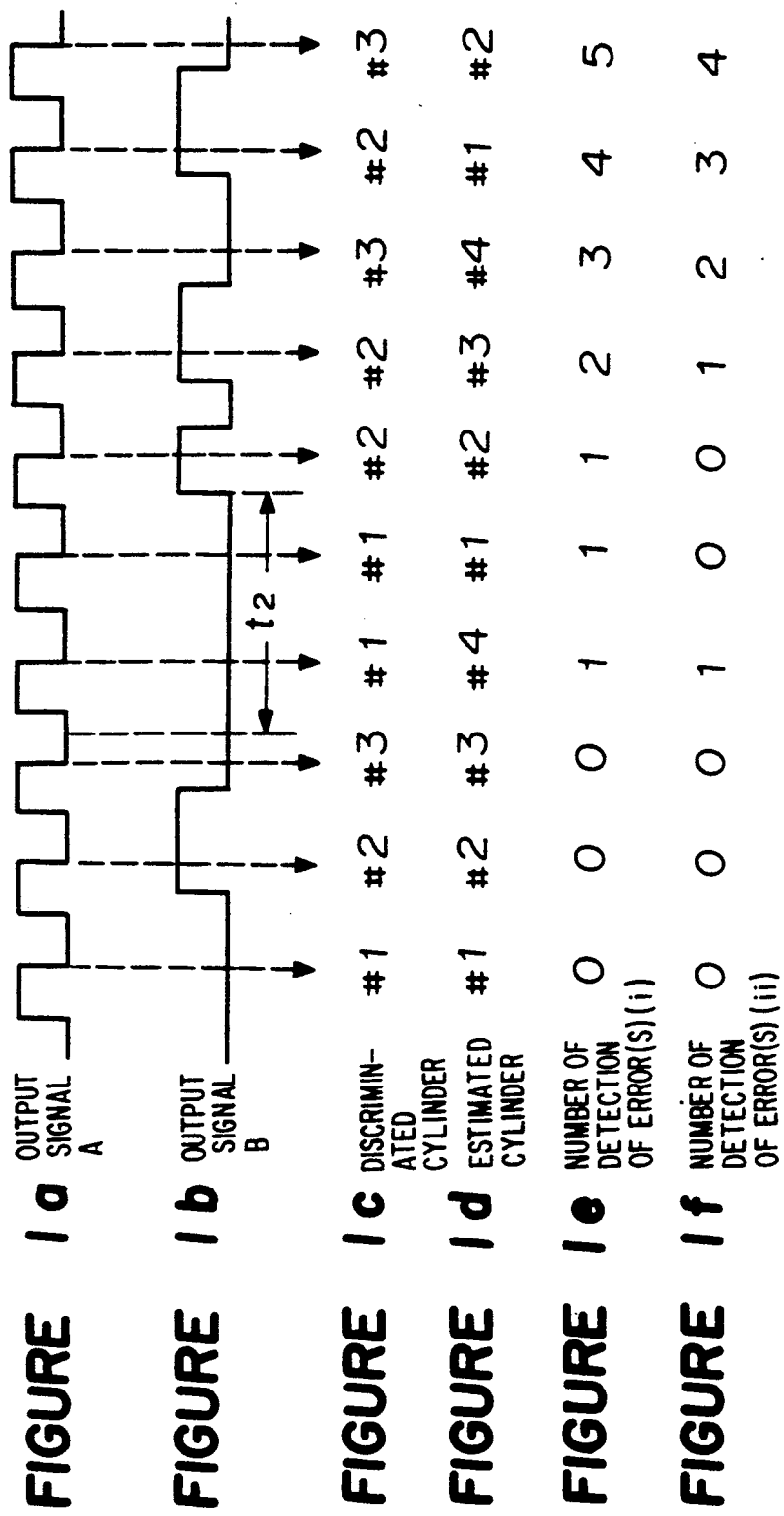

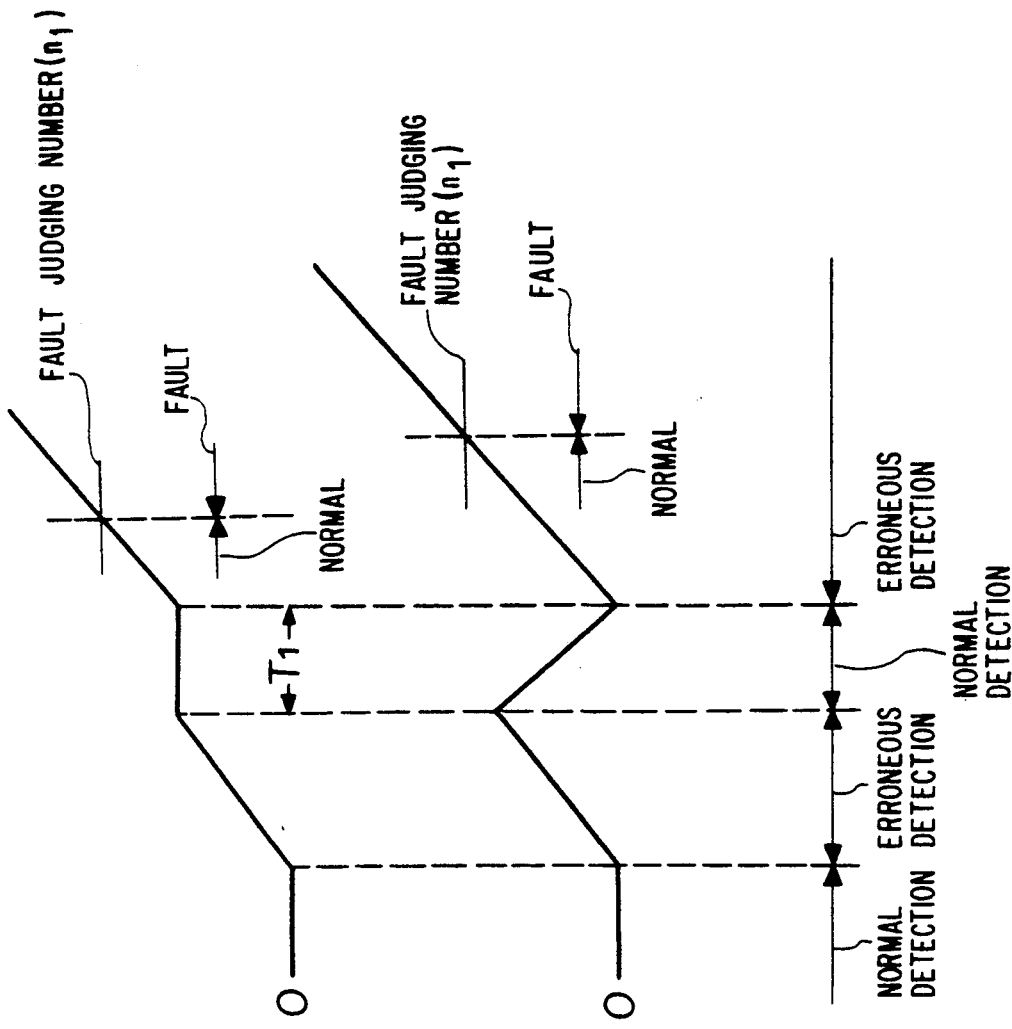

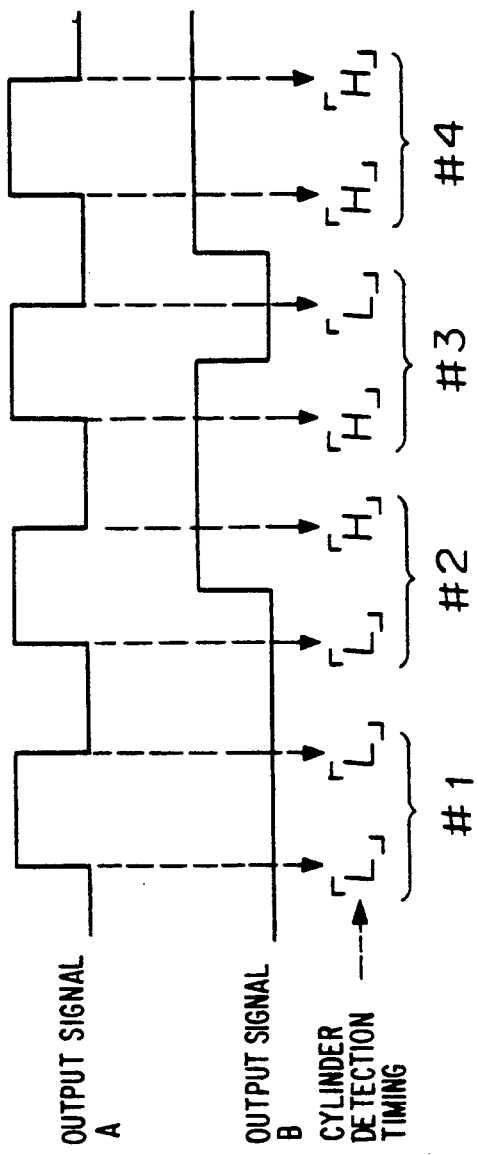
FIGURE 3a OUTPUT SIGNAL A
FIGURE 3b OUTPUT SIGNAL B
FIGURE 3c CYLINDER DETECTION TIMING
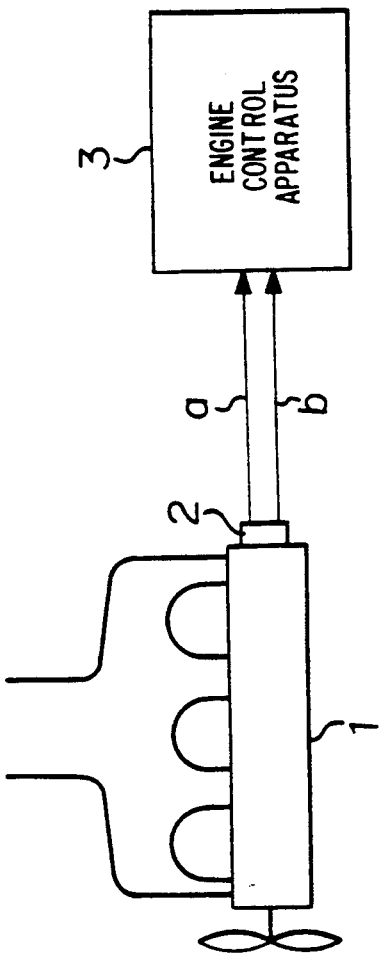
FIGURE 4

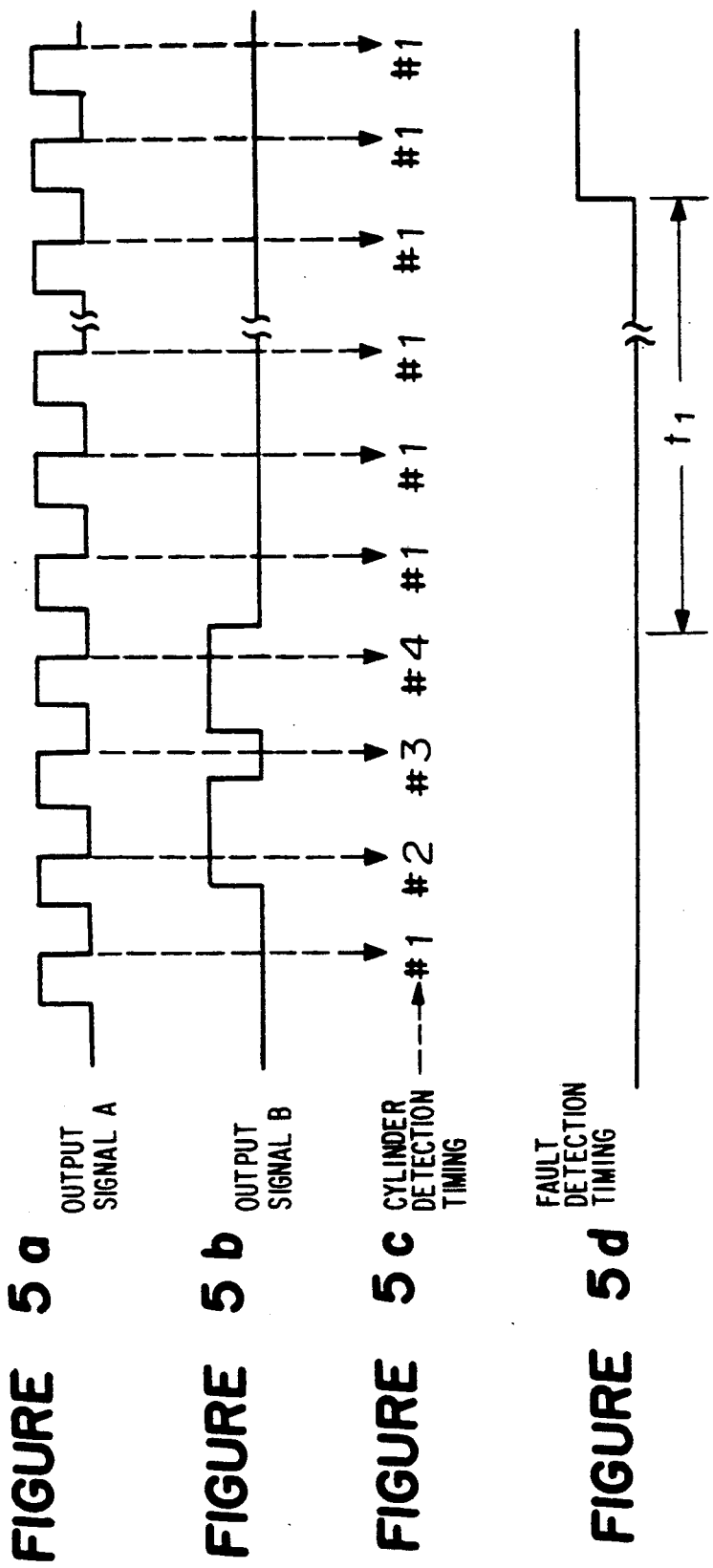

ENGINE CONTROL APPARATUS

BACKGROUND OF THE INVENTION

1. Field of the Invention

The present invention relates to an engine control apparatus to judge a fault of the sensor.

2. Discussion of Background

A system in which an engine control apparatus capable of judging a fault of the sensor is used generally has the construction as shown in FIG. 4, wherein a reference numeral 1 designates an engine, a numeral 2 designates an engine revolution speed sensor which detects the revolution number of the engine, which is attached to the engine, and a numeral 3 designates an engine control apparatus. The engine revolution speed sensor 2 generates a signal a having a frequency in proportion to the revolution number of the engine 1 and a signal b for discriminating the cylinders of the engine, the signals a, b being supplied to the engine control apparatus 3. The engine control apparatus 3 is adapted to perform a fuel control and an ignition timing control to the engine on the basis of the signals of the revolution speed sensor 2 and to detect that the revolution speed sensor 2 has become faulty. When the engine control apparatus 3 makes the judgment of a faulty state of the sensor 2, it operates the entire system to the fail-safe direction.

FIG. 5 is a timing chart for illustrating a conventional method of judging a faulty state in a revolution speed sensor.

FIGS. 5a and 5b show a timing in each output signal a, b; FIG. 5c shows a timing to detect the cylinders of the engine 1 and the cylinders discriminated thereby; and FIG. 5d shows a timing to detect the fault of the revolution speed sensor 2. In the conventional method of judging the fault of the revolution sensor, the judgment of the fault of the revolution sensor 2 was made when the level of the output signal a or the output signal b of the revolution sensor 2 does not change for a predetermined time $t_1$ or longer during the operation of the engine as shown in FIG. 5.

Although the conventional technique of judging the fault of the sensor in the engine control apparatus correctly judged the fault of the sensor when the output signal of the revolution speed sensor was not provided for a predetermined time or longer, the following disadvantage was found. Namely, it was impossible to make the judgment of the fault of the sensor when a state of no change in the output signal of the revolution speed sensor continued for a time $t_2$ ($t_2 < t_1$) due to contact failure in the wiring between the revolution speed sensor and the engine control apparatus or external noises on the wiring, or when an abnormal signal was outputted from the revolution speed sensor. Further, there was a problem of shortening the lifetime of the engine if an inadequate cylinder was selected by the abnormal signal and the fuel supply and ignition control were made on the inadequate cylinder.

SUMMARY OF THE INVENTION

It is an object of the present invention to provide an engine control apparatus which can detect a fault of the sensor when a regular pattern of the information provided from the sensor is not detected.

The foregoing and other objects of the present invention have been attained by providing an engine control apparatus for detecting the position of the engine main body or the actuator attached to an engine on the basis of information provided from a sensor which generates two signals having different phase, characterized in that said sensor is judged to be faulty when the regular pattern of the information outputted from said sensor is not detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 (including 1a-1f) is a timing chart showing a timing in the operation of an embodiment of the engine control apparatus according to the present invention;

FIG. 2 (including parts 2a-2c) is a diagram for explaining how a fault occurred in the apparatus is judged;

FIG. 3 (including parts 3a-3c) is a timing chart for explaining the discrimination of the cylinders of the engine;

FIG. 4 is a diagram showing the construction of an embodiment of the engine control apparatus; and FIG. 5 (including 5a-5d) is a timing chart for explaining how the fault of a conventional engine control apparatus is judged.

DETAILED DESCRIPTION OF THE PREFERRED EMBODIMENTS

An embodiment of the engine control apparatus of the present invention will be described with reference to the drawings.

The engine control apparatus is to judge a fault of a revolution speed sensor 2 by detecting a regular pattern obtained by the combination of two signals a, b outputted from the revolution speed sensor 2 to thereby discriminate the cylinders of an internal combustion engine 1.

FIG. 3 is a timing chart showing an example of discriminating four cylinders in the engine on the basis of a regular pattern obtained by the combination of two output signals a, b of the revolution speed sensor 2. FIG. 3a shows the timing of the output signal a of the revolution speed sensor 2; FIG. 3b shows the timing of the output signal b; and FIG. 3c shows the timing of detecting the four cylinders by using the engine control apparatus 3 of the present invention.

The cylinders of the engine are discriminated with timing at the falling of the output signal a. When the level of the output signal b at the rising of the output signal a is x and the level of the output signal b at the falling of the output signal a is y, the following cylinder discrimination is effected by the combination of x and y.

When the levels x, y are respectively "L", "L", the first cylinder #1 is discriminated. When the levels x, y are respectively "L", "H", the second cylinder #2 is discriminated. When the levels x, y are respectively "H", "L", the third cylinder #3 is discriminated. When the levels x, y are respectively "H", "H", the fourth cylinder #4 is discriminated. Thus, when the revolution speed sensor operates normally, the discrimination of the cylinders is sequentially and correctly carried out. In this case, after the fourth cylinder has been discriminated, the first cylinder #1 is discriminated next.

FIG. 1 is a timing chart for explaining the operation of an embodiment of the engine control apparatus according to the present invention. In the present invention, it is possible to detect the fault of the revolution speed sensor 2, which is resulted from the fact that a state of no change in the output signal from the revolution speed sensor continues for a time $t_2$ ($t_2 < t_1$) due to contact failure on the wiring or external noises on the wiring or an abnormal signal is provided from the revolution speed sensor, which was impossible in the conventional fault detection system.

FIG. 1a shows the timing of the output signal a; FIG. 1b shows the timing of the output signal b; FIG. 1c shows the cylinders discriminated by the combination of the output signals a, b; FIG. 1d shows the cylinders which are estimated in a case that a correct information of the cylinders is provided from the signals of the revolution speed sensor; FIG. 1e shows the number of error detection (i) in the error detection system of the present invention when the output signal b of the revolution speed sensor 2 pauses for a short time $t_2$; and FIG. 1f shows the number of error (ii) in accordance with another error detection signal, for reference, when the output signal b of the revolution speed sensor 2 pauses for a short time $t_2$. As shown in FIG. 1c, the cylinders are discriminated as #1, #2, #3, ... by the combination of the output signals a, b at the falling of the output signal a, and the discriminated cylinders are respectively and sequentially compared with the estimated cylinders. When the discriminated cylinder is not in agreement with the estimated cylinder, the number of error detection is counted from this time point. When a counted value, i.e. the number of the error detection reaches a predetermined value, the fault of the revolution speed sensor is judged.

The number of the error detection in each of the error detection systems (i), (ii) indicates the recognized number of error detection wherein the discriminated cylinders as shown in FIG. 1c and the estimated cylinders as shown in FIG. 1d are disagreement. The error detection system (i) is such system that the number of the error detection is held when the discriminated cylinder and the estimated cylinder is in agreement. On the other hand, the error detection system (ii) is such system that the number of the error detection is counted down. In either error detection systems (i), (ii), the judgment of the fault of the revolution speed sensor is made when the number of the error detection reaches a value more than a predetermined number (n1).

FIG. 2a is a graph showing a result obtained by the first error detection system (i); FIG. 2b is a graph showing a result obtained by the second error detection system (ii) and FIG. 2c shows the detection zone of cylinder.

As shown in FIG. 2c, in a case that normal detection periods wherein the discriminated cylinder is in agreement with the estimated cylinder and erroneous detection periods wherein the discriminated cylinder is in disagreement with the estimated cylinder alternately occur, it is understood that the second error detection system takes a time longer than the first error detection system in the judgment of the fault of the revolution speed sensor. Namely, since in the second error detection system, the number of the error detection is counted down when the discriminated cylinder is in agreement with the estimated cylinder (while the first error detection system holds the number of the error detection), the second error detection system takes a longer time until the number of the error detection reaches the fault judging number (n1) so that the revolution speed sensor is recognized as being faulty.

As described above, the engine control apparatus of the present invention is so constructed that the cylinders of the engine are discriminated by detecting the patterns obtained by the combination of the two output signals of the revolution speed sensor; when the regular pattern is not detected by the failure of the revolution speed sensor and the cylinder discrimination detection is counted up; when a count value (an error detection number) reaches a predetermined value, the judgment that the revolution speed sensor becomes faulty is made. Thus, in accordance with the present invention, the cylinder discrimination is effected as to whether or not the cylinders are correctly discriminated on the basis of the output signal generated from the revolution speed sensor at a short timing. Accordingly, a negative judgment can be made on the discriminated cylinders even when a time when the revolution speed sensor holds in an abnormal state, or an abnormal output signal is generated from the revolution speed sensor due to an external noise. Thus, a correct judgment of the fault of the revolution speed sensor is obtainable.

The engine control apparatus of the present invention is applicable, other than the cylinder discrimination system as described above, to a system wherein an actuator attached to the engine is controlled by means of a motor, and the direction of the rotation of the motor and the rotating angle of the motor are detected by using two sensors. In this case, the judgment of the fault of the two sensors can be performed with a simple construction.

As described above, in accordance with the engine control apparatus of the present invention, the judgment of the fault of the sensor is made when the regular pattern obtained by the information outputted from the sensor can not be detected. Accordingly, a correct judgment is obtainable even when a state of no change of the output signal from the revolution speed sensor due to contact failure on the wiring and external noises on the wiring continues for a short time, or even when an abnormal signal is outputted from the revolution speed sensor.

Obviously, numerous modifications and variations of the present invention are possible in light of the above teachings. It is therefore to be understood that within the scope of the appended claims, the invention may be practiced otherwise than as specifically described herein.

What is claimed is:

1. An engine control apparatus for detecting the malfunction of a sensor which detects the position of an engine main body or an actuator attached to said engine, comprising:

a single discrete sensor for generating two signals having different phase, wherein the output of said sensor discriminates one of a number of cylinders depending upon a regular pattern formed by a combination of said two signals generated by said sensor;

comparing means for comparing said regular pattern formed by said two signals generated by said sensor with a reference pattern representing an estimated cylinder that is to be discriminated by said sensor, wherein an error results where said regular pattern formed by said two signals generated by said sensor does not correspond to said reference pattern representing said estimated cylinder; and counting means for counting the number of errors detected by said comparing means, wherein a malfunction of said sensor is determined to exist when the number of errors detected exceeds a predetermined value.

2. The engine control apparatus according to claim 1, wherein said sensor discriminates said one of a number of cylinders by generating said regular pattern by the combination of the levels of one signal generated from said sensor at the rising time and the falling time of the other signal generated from said sensor.

3. The engine control apparatus according to claim 2, wherein said engine control apparatus counts the number of errors detected when the discriminated cylinder does not agree with said estimated cylinder; and the number of errors detected is held even when a discriminated cylinder agrees with said estimated cylinder in the next discrimination.

4. A method of detecting the malfunction of a sensor which detects the revolution speed of an engine, comprising the steps of:

a) monitoring the output signals of said sensor;
b) determining the pattern produced by the combination of said output signals from said sensor;
c) providing a reference pattern representative of the pattern produced by the combination of said output signals of said sensor when said sensor is operating properly;
d) comparing the pattern produced by the combination of said output signals from said sensor with said reference pattern;
e) detecting an error of said sensor when the pattern produced by the combination of said output signals from said sensor does not correspond to said reference pattern;
f) counting the number of errors detected; and
g) determining a malfunction of said sensor when the number of errors detected exceeds a predetermined value.

* * * * *